June 24, 1930.　　　O. M. KIRLIN　　　1,767,373
SPOTLIGHT
Filed May 17, 1929
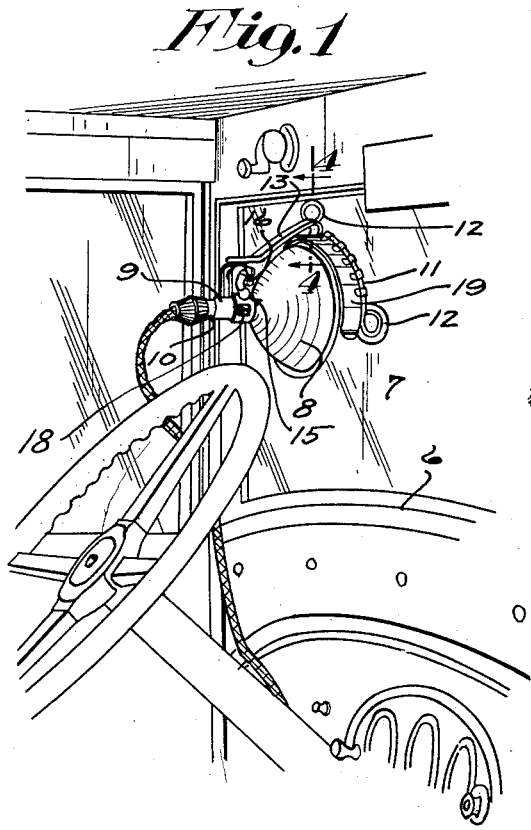
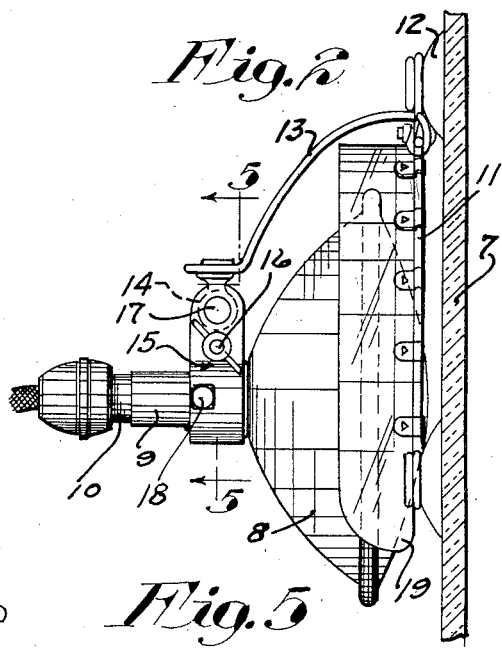
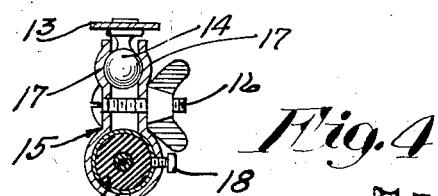
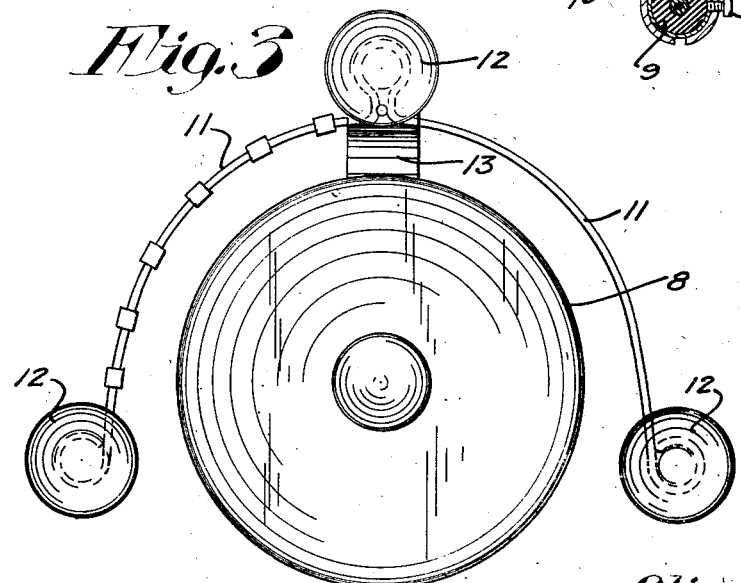
Inventor
Otis M. Kirlin
By his Attorneys
Merchant and Kirmore Patented June 24, 1930

1,767,373

UNITED STATES PATENT OFFICE

OTIS M. KIRLIN, OF WATERTOWN, SOUTH DAKOTA

SPOTLIGHT

Application filed May 17, 1929. Serial No. 363,782.

My present invention has for its object to provide a simple and highly efficient mounting for attaching a spotlight to a support. This mounting, while intended for general use, is especially well adapted for attaching a spotlight to the inner face of the wind shield of a motor propelled vehicle within easy reach of the operator and where the light therefrom will be projected through the wind shield for illuminating the road-bed. Said mounting in its preferred form permits universal angular adjustment of the spotlight to position the same to illuminate different portions of the road-bed or the sides thereof or for use when reading signs and the like.

The invention further provides a glare shield for intercepting certain rays of light from the spotlight that are projected between the spotlight and wind shield, and that would interfere with the vision of the operator. The mounting permits ready removal of the spotlight therefrom for use as a portable trouble lamp or the like.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary perspective view of an automobile having a spotlight applied to the wind shield thereof by means of the improved mounting;

Fig. 2 is a right-side elevation of the spotlight and mounting together with a part of the wind shield shown in section;

Fig. 3 is a face view of the spotlight and mounting removed from the wind shield;

Fig. 4 is a fragmentary detail view in section taken on the line 4—4 of Fig. 1 on an enlarged scale; and Fig. 5 is a detail view principally in section taken on the irregular line 5—5 of Fig. 2.

The numeral 6 indicates an automobile, as an entirety, with the exception of its wind shield 7. The spotlight illustrated is of standard construction and is indicated as an entirety by the numeral 8 with the exception of a tubular extension 9, at the back and axis thereof, and the lamp socket 10 is mounted therein.

Referring now in detail to the mounting from the spotlight 8, the same includes a yoke-like frame 11 formed from a stiff rod having vacuum cups 12 at its ends and intermediate portion. These vacuum cups 12 are arranged to be pressed against the inner face of the wind shield 7, as best shown in Figs. 2 and 4, for detachably supporting the mounting therefrom. This mounting 11 further includes a rearwardly and downwardly curved arm 13, rigidly secured to the frame 11 at the top thereof, and has on its rear end the ball member 14 of a ball and socket joint.

A two-part clamp 15 is provided for detachably securing the spotlight 8 to the arm 13, as best shown in Fig. 5. This clamp 15 comprises a pair of laterally spaced upright members having segmental lower end portions, which embrace the tubular extension 9 of the spotlight 8, and a thumb nut-equipped draw bolt 16, which intermediately connects said members. In the upper end portions of the members of the clamp 15 are co-operating half-sockets 17 in which the ball member 14 is fitted. Obviously the ball and socket members, 14—17 permit universal angular adjustment of the spotlight 8.

By reference to Fig. 3, it will be noted that the arm 13 and clamp 15 support the spotlight 8 concentric with the frame 11. The tightening of the thumb nut-equipped bolt 16 will frictionally press the clamp 15 onto the tubular extension 9 and onto the bolt member 14 for securing the spotlight 8 in its adjusted position. A set screw 18 having threaded engagement with one member of the clamp 15, extends through a hole in the extension 9, impinges against the lamp socket 9 and hold the same axially adjusted in the spotlight 8. This adjustment of the socket 9 is, of course, for focusing the lamp bulb of the spotlight 8.

By releasing the clamp 15, the spotlight 8 may be detached from its mounting and carried to any desired point within reach of its cord. The vacuum cups 12, of course, permit the mounting to be readily removed from the wind shield 7 or applied thereto in any desired position.

A segmental glare shield 19 is applied to the right side of the frame 11 for intercepting certain rays of light from the spotlight that are projected between said spotlight and the wind shield 7 and that would interfere with the vision of the operator. This glare shield 19 may be made from a piece of colored celluloid or any other suitable material.

While in the drawings the glare shield 19 is shown at only one side of the spotlight, it is, of course, understood that it may extend on both sides thereof and made continuous or in sections.

When using the spotlight as a trouble light, it may be removed from the wind shield by pulling the vacuum cups loose and then applying them to glass or any other smooth surface about the car, and the light turned in any desired direction. When not in use the spotlight may be hung on a hook or other support on the under side of the dash of the car.

What I claim is:

1. A mounting for a spotlight comprising a yoke-like frame having spaced vacuum cups for attaching the same to a support, a rearwardly projecting arm on the frame, and means on the arm for attaching a spotlight thereto substantially at the center of the frame.

2. A mounting for a spotlight comprising a yoke-like frame having spaced vacuum cups for attaching the same to a support, a rearwardly projecting arm on the frame, a clamp for attaching a spotlight to the arm at substantially the center of the frame, and a universal joint between the arm and clamp.

3. The structure defined in claim 2 in which the clamp is operable to rigidly hold the universal joint with the spotlight in its adjusted position.

4. A mounting for a spotlight comprising a frame having a plurality of spaced vacuum cups, a rearwardly projecting arm on the frame, and means for attaching the spotlight to the arm at substantially the center of the frame.

In testimony whereof I affix my signature.

OTIS M. KIRLIN.